United States Patent
Hapgood

(10) Patent No.: US 11,877,610 B2
(45) Date of Patent: Jan. 23, 2024

(54) GARMENT ACCESSORY FOR COILING GARMENT FABRIC AROUND ITSELF TO FORM AN APPEARANCE OF A KNOT AND ASSOCIATED METHOD(S)

(71) Applicant: Jasmine Juanita Hapgood, Jacksonville, FL (US)

(72) Inventor: Jasmine Juanita Hapgood, Jacksonville, FL (US)

( * ) Notice: Subject to any disclaimer, the term of this patent is extended or adjusted under 35 U.S.C. 154(b) by 42 days.

(21) Appl. No.: 17/822,301

(22) Filed: Aug. 25, 2022

(65) Prior Publication Data

US 2023/0255270 A1  Aug. 17, 2023

Related U.S. Application Data

(63) Continuation-in-part of application No. 17/672,563, filed on Feb. 15, 2022, now abandoned.

(51) Int. Cl.
| | |
|---|---|
| *A41D 15/00* | (2006.01) |
| *A41D 1/00* | (2018.01) |
| *A41B 1/20* | (2006.01) |
| *B32B 3/04* | (2006.01) |
| *B32B 15/14* | (2006.01) |
| *B32B 15/20* | (2006.01) |
| *B32B 5/02* | (2006.01) |

(52) U.S. Cl.
CPC ............... *A41D 15/00* (2013.01); *A41B 1/20* (2013.01); *A41D 1/007* (2013.01); *B32B 3/04* (2013.01); *B32B 5/02* (2013.01); *B32B 15/14* (2013.01); *B32B 15/20* (2013.01); *B32B 2307/546* (2013.01); *B32B 2437/00* (2013.01)

(58) Field of Classification Search
CPC ............ B32B 3/04; B32B 5/02; B32B 15/14; B32B 15/20; B32B 2307/546; B32B 2437/00

See application file for complete search history.

(56) References Cited

U.S. PATENT DOCUMENTS

| | | | | |
|---|---|---|---|---|
| 3,471,867 A | * | 10/1969 | Kirchhoff | A41D 23/00 132/273 |
| 4,774,726 A | * | 10/1988 | Garrett | A41D 1/22 2/919 |
| 4,788,722 A | * | 12/1988 | Oliver | A41D 23/00 2/207 |
| 4,989,267 A | * | 2/1991 | Watson | A63B 21/065 2/2.5 |
| 5,233,704 A | * | 8/1993 | Booher | A41D 23/00 2/207 |
| 6,175,961 B1 | * | 1/2001 | Linden | A41F 19/005 2/125 |
| 8,347,416 B1 | * | 1/2013 | Query | A44B 1/18 2/244 |

(Continued)

*Primary Examiner* — Jocelyn Bravo
(74) *Attorney, Agent, or Firm* — Ashkan Najafi

(57) ABSTRACT

A clothing garment accessory includes a metal strip configured to be positioned inside an existing garment fabric while being worn by a user. The strip is flexible and configured to be morphed into a coiled helical shape at a bottom hem of the existing garment fabric. The metal strip is further configured to create a knot-like appearance at the bottom hem of the existing garment fabric. The metal strip is hidden from ambient lines of sight exterior of the existing garment fabric when the knot-like appearance exists at the bottom hem of the existing garment fabric.

6 Claims, 7 Drawing Sheets

(56) References Cited

U.S. PATENT DOCUMENTS

| | | | |
|---|---|---|---|
| 8,782,816 B2 * | 7/2014 | Bielobocky | A41D 23/00 2/207 |
| 10,287,721 B1 * | 5/2019 | Rizzo | A41D 27/08 |
| 10,959,471 B2 * | 3/2021 | Roemer | A42B 1/041 |
| 2010/0043125 A1 * | 2/2010 | MacLean | A44B 11/04 2/336 |
| 2012/0210492 A1 * | 8/2012 | Bielobocky | A41D 23/00 2/207 |
| 2014/0223702 A1 * | 8/2014 | Stevenson | A41F 1/00 24/566 |
| 2016/0100634 A1 * | 4/2016 | Rogers | A41B 1/20 2/256 |
| 2016/0278463 A1 * | 9/2016 | Stevenson | A45D 8/34 |

* cited by examiner

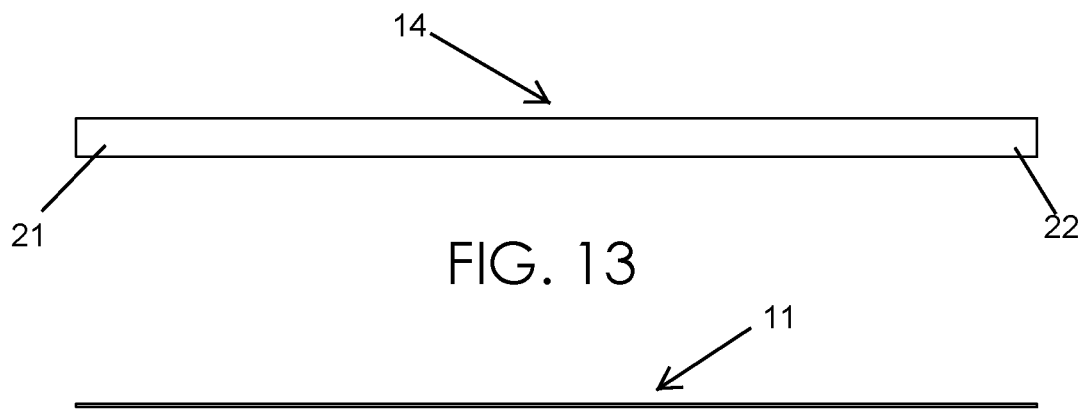
FIG. 13
FIG. 14
FIG. 15
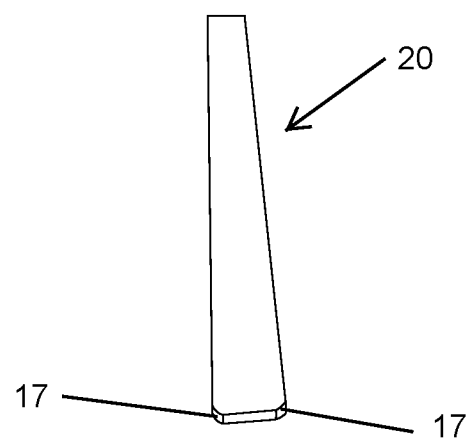
FIG. 16

GARMENT ACCESSORY FOR COILING GARMENT FABRIC AROUND ITSELF TO FORM AN APPEARANCE OF A KNOT AND ASSOCIATED METHOD(S)

CROSS REFERENCE TO RELATED APPLICATIONS

This is a continuation-in-part application that claims priority to and benefit of co-pending U.S. patent application Ser. No. 17/672,563, filed 2-15-22, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

This invention relates to garment accessories and, more particularly, to a flexible, and deformable garment accessory capable of being morphed into a coiled (helical) shape for coiling garment fabric around itself to form a temporary and decorative knot-like appearance in the garment fabric, without permanently stretching or damaging the garment fabric.

Prior Art

Often, upper torso clothing garments that are loose or untucked look better when a bottom edge thereof is tied in a knot. Unfortunately, the fabric of a t-shirt, shirt, blouse, sweater, dress, skirt, tunic, night-gown, or scarf can become stretched out of shape when tying the fabric into a knot. Knots formed using fabric alone loosen throughout the day and require re-knotting.

Accordingly, a need remains for a flexible, and deformable garment accessory in order to overcome the above-noted shortcomings. The present invention satisfies such a need by providing a flexible, and deformable garment accessory capable of being morphed into a coiled (helical) shape that is convenient and easy to use, is durable yet lightweight in design, is versatile in its applications, and coils garment fabric around itself to form a temporary and decorative knot-like appearance in the garment fabric, without permanently stretching or damaging the garment fabric.

BRIEF SUMMARY OF NON-LIMITING EXEMPLARY EMBODIMENT(S) OF THE PRESENT DISCLOSURE

In view of the foregoing background, it is therefore an object of the present invention to provide a flexible, and deformable garment accessory capable of being morphed into a coiled (helical) shape for coiling garment fabric around itself to form a temporary and decorative knot-like appearance in the garment fabric, without permanently stretching or damaging the garment fabric. These and other objects, features, and advantages of the invention are provided by a clothing garment accessory including a metal strip configured to be positioned inside an existing garment fabric while being worn by a user. Advantageously, the metal strip is flexible and configured to be morphed into a coiled helical shape at a bottom hem of the existing garment fabric. Advantageously, the metal strip is further configured to create a knot-like appearance at the bottom hem of the existing garment fabric. Advantageously, the metal strip is hidden from ambient lines of sight exterior of the existing garment fabric when the knot-like appearance exists at the bottom hem of the existing garment fabric.

In a non-limiting exemplary embodiment, the metal strip has an elongated rectangular shape provided with beveled corners.

In a non-limiting exemplary embodiment, a textile fabric is disposed about the metal strip. Such a textile fabric includes a continuous peripheral edge having an uninterrupted and flexible seam.

In a non-limiting exemplary embodiment, the metal strip has a single, unitary, and solid body configured to be deformably morphed between alternate shapes.

In a non-limiting exemplary embodiment, the metal strip is planar and provided with a proximal end and a distal end axially opposed therefrom when the metal strip is at an initial shape.

In a non-limiting exemplary embodiment, the metal strip is configured to be repeatedly transformed between the initial shape and the coiled helical shape. Notably, the proximal end is axially offset from the distal end when the metal strip has the coiled helical shape.

In a non-limiting exemplary embodiment, the coiled helical shape is configured to twist the bottom hem into the knot-like appearance.

The present disclosure also includes a method for creating a knot-like appearance in a garment fabric including the chronological steps of: providing a garment fabric; a user wearing the garment fabric over an upper torso of the user; providing and positioning a flexible metal strip inside the garment fabric worn by the user; morphing the metal strip into a coiled helical shape at a bottom hem of the garment fabric; and the metal strip creating a knot-like appearance at the bottom hem of the garment fabric. Advantageously, the metal strip is hidden from ambient lines of sight exterior of the garment fabric when the knot-like appearance exists at the bottom hem of the garment fabric.

The present disclosure further includes a method for creating a knot-like appearance in a garment fabric, including the chronological steps of: providing and wearing a clothing garment over an upper torso of a user body; providing a metal strip; pulling out a bottom hem of the clothing garment in front of the user; holding the clothing garment at the bottom hem; positioning the metal strip underneath the clothing garment such that the metal strip is intercalated between the user stomach and the clothing garment; positioning a bottom edge of the metal strip above the bottom hem of the clothing garment; and vertically orienting the metal strip relative to a longitudinal length of the clothing garment.

Such chronological steps further include: gripping the bottom edge of the metal strip and pushing it towards an anterior direction into the clothing garment so that the metal strip upwardly and frictionally engages the posterior side of the clothing garment; with one hand, gripping the bottom hem of the clothing garment together with the bottom edge of the metal strip and, with the other hand, firmly gripping an upper portion of the clothing garment together with the top edge of the metal strip; while firmly holding the top edge of the metal strip and upper portion of the clothing garment at a fixed and stationary position, contemporaneously rotating the bottom hem of the clothing garment and the bottom edge of the metal strip together about the top edge of the metal strip and upper portion of the clothing garment such that the metal strip begins to form a coiled shape and thereby creating a loop and a knot-like appearance in the clothing garment; sliding a user metacarpal out from the loop at the top edge of the metal strip and upper portion of the clothing garment; and continuing to rotate the metal strip until a desired shape of the knot-like appearance is achieved.

In a non-limiting exemplary embodiment, the method further includes the chronological steps of: undoing the knot-like appearance by unwinding the coiled metal strip in an opposite rotational direction; and releasing the bottom hem of the clothing garment from its knot-like appearance and the metal strip.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 13 is a top plan view of the metal strip not wrapped with a fabric textile and used to create a knot-like appearance in a clothing garment, in accordance with a non-limiting exemplary embodiment of the present disclosure;

FIG. 14 is a side elevational view of the metal strip shown in FIG. 13;

FIG. 15 is a side elevational view of a partially morphed metal strip after it has been unwound from a coiled position; and FIG. 16 is a perspective view of the metal strip shown in FIG. 13 wherein the corners are beveled for not damaging the garment fabric.

Figure 1:
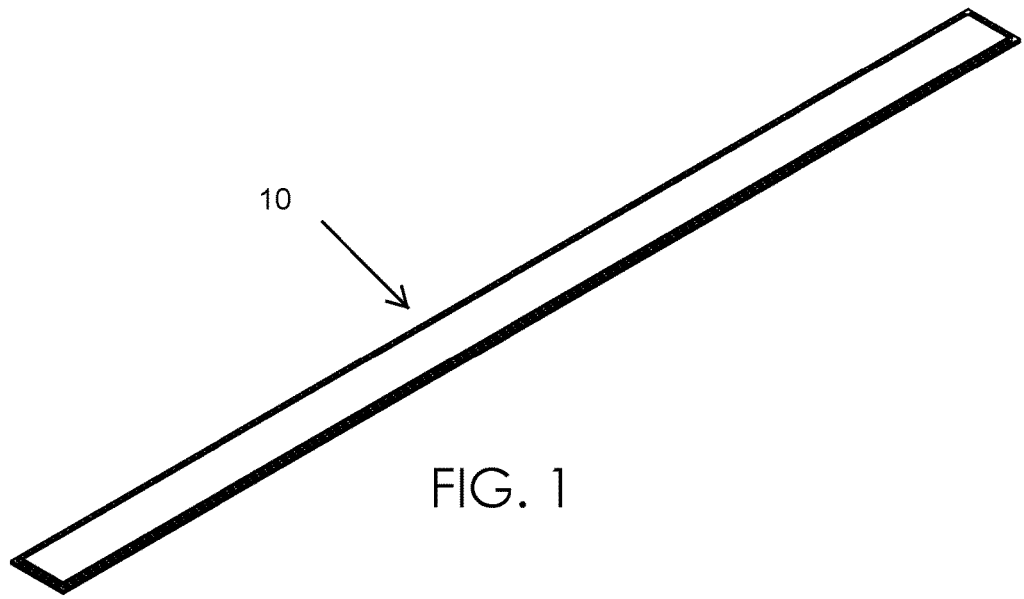
FIG. 1 is a perspective view of a metal strip wrapped with a fabric textile and used to create a knot-like appearance in a clothing garment, in accordance with a non-limiting exemplary embodiment of the present disclosure.
Figure 2:
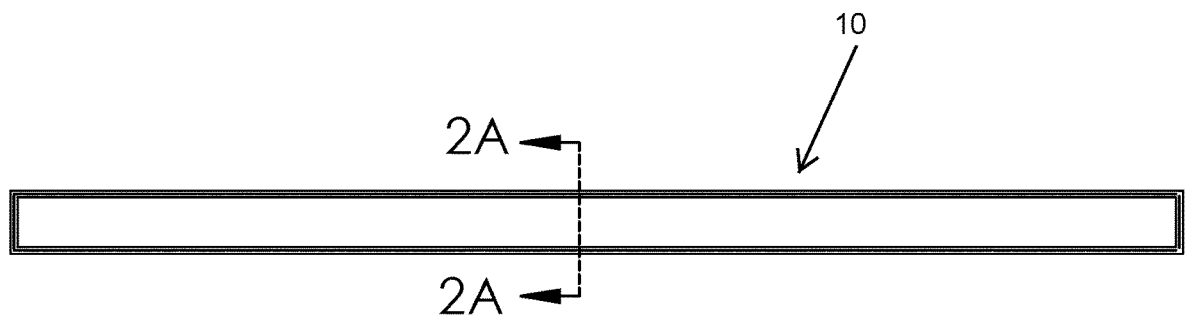
FIG. 2 is a top plan view of the metal strip shown in FIG. 1.
Figure 2A:
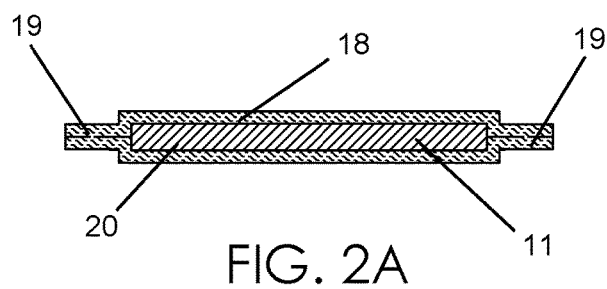
FIG. 2A is an enlarged cross-sectional view taken along line 2A-2A in FIG. 2.
Figure 3:
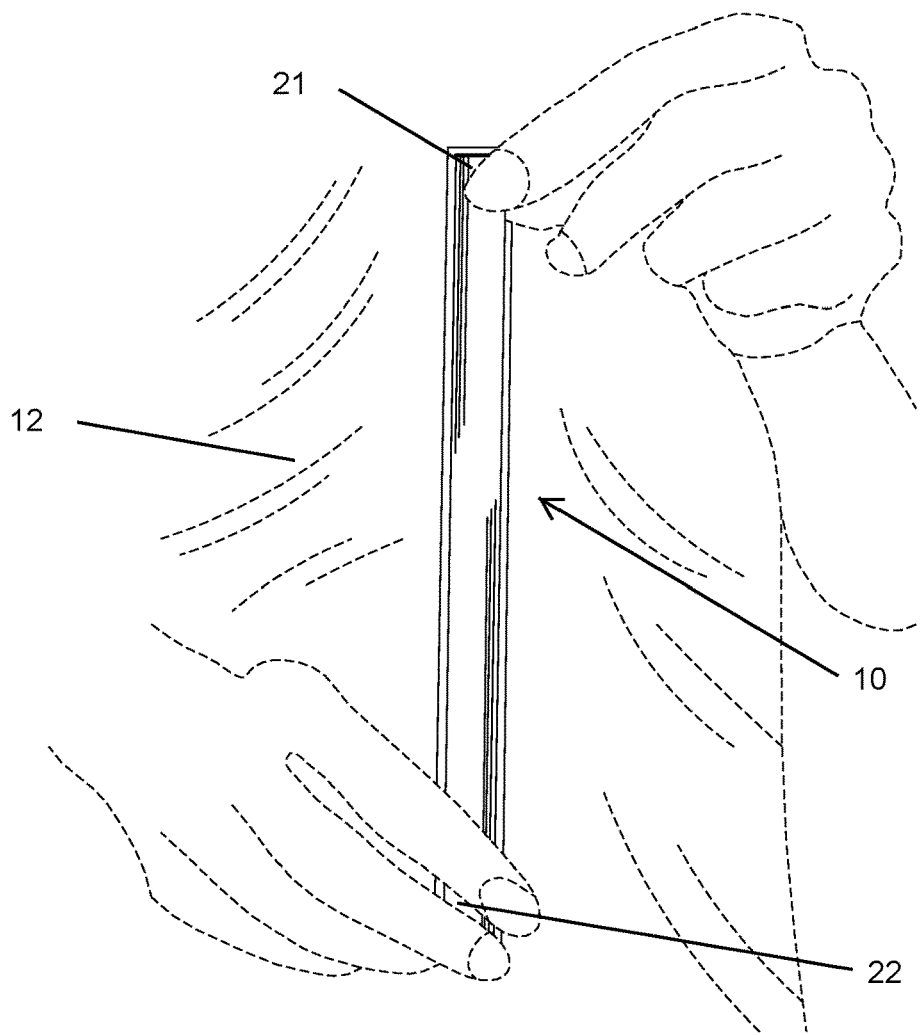
FIG. 3 is a front elevational view showing an exemplary step for using the metal strip with a clothing garment to create a knot-like appearance in the garment fabric.
Figure 4:
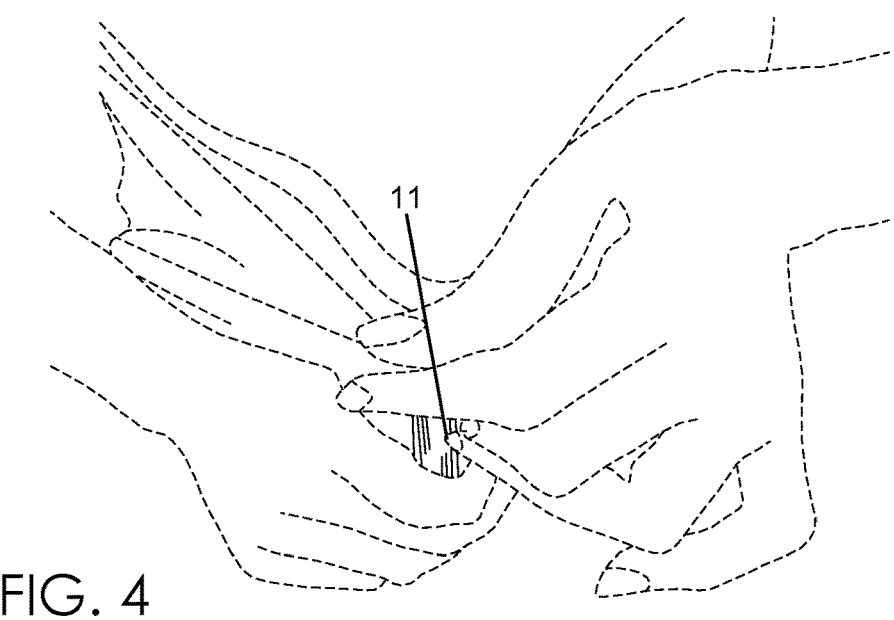
FIG. 4 is a front elevational view showing another exemplary step for using the metal strip with a clothing garment to create a knot-like appearance in the garment fabric.
Figure 5:
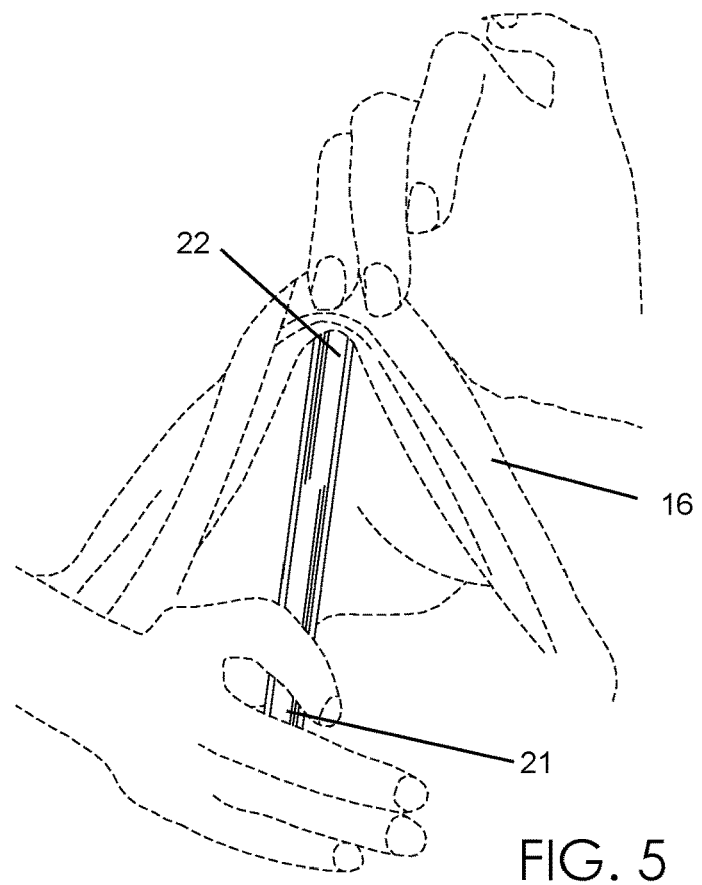
FIG. 5 is a front elevational view showing another exemplary step for using the metal strip with a clothing garment to create a knot-like appearance in the garment fabric.
Figure 6:
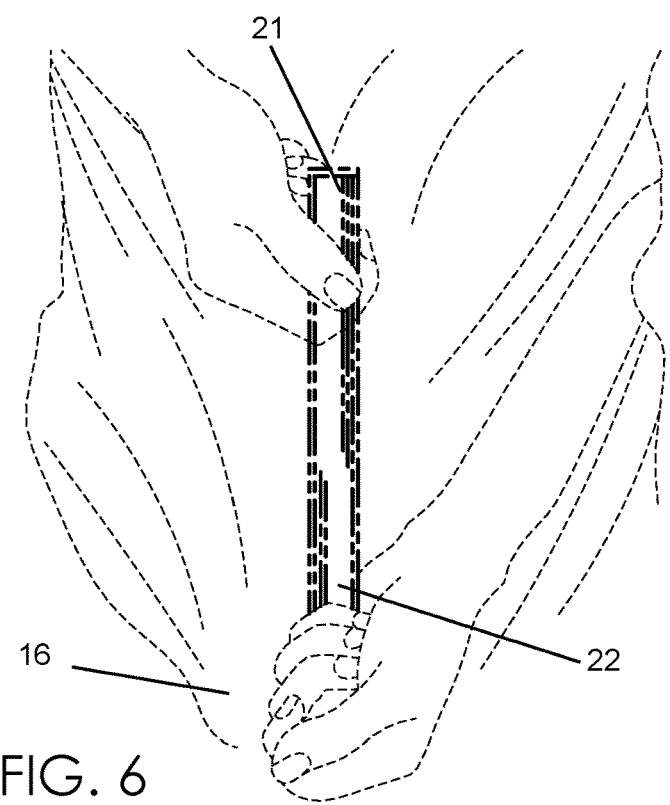
FIG. 6 is a front elevational view showing another exemplary step for using the metal strip with a clothing garment to create a knot-like appearance in the garment fabric.
Figure 7:
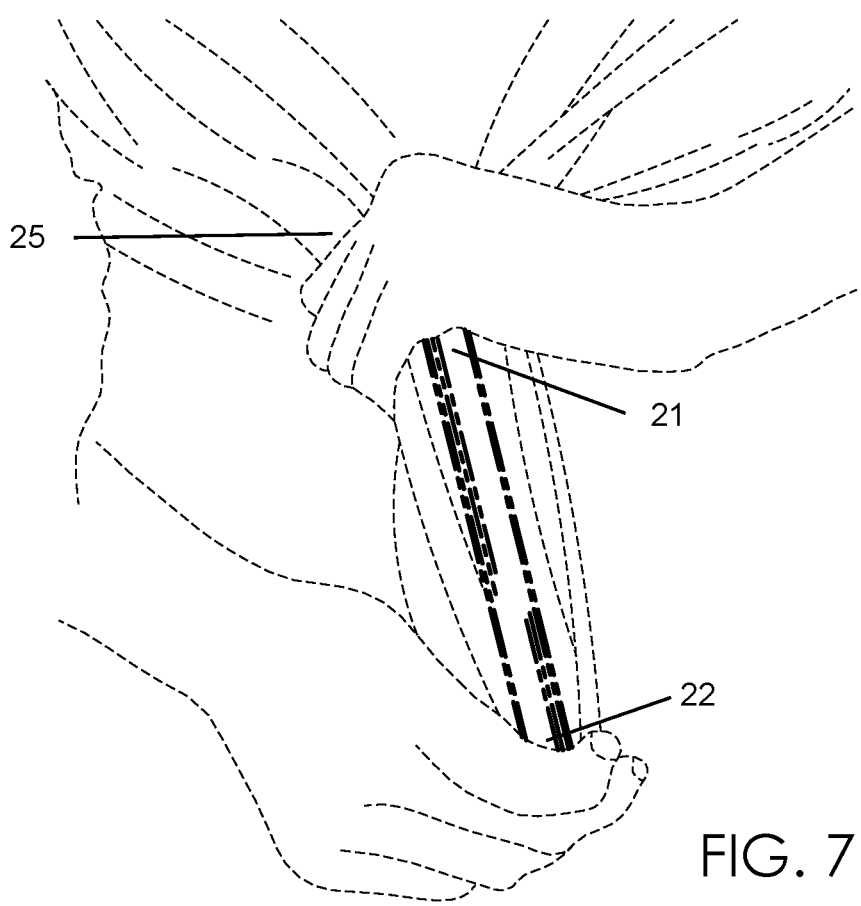
FIG. 7 is a front elevational view showing another exemplary step for using the metal strip with a clothing garment to create a knot-like appearance in the garment fabric.
Figure 8:
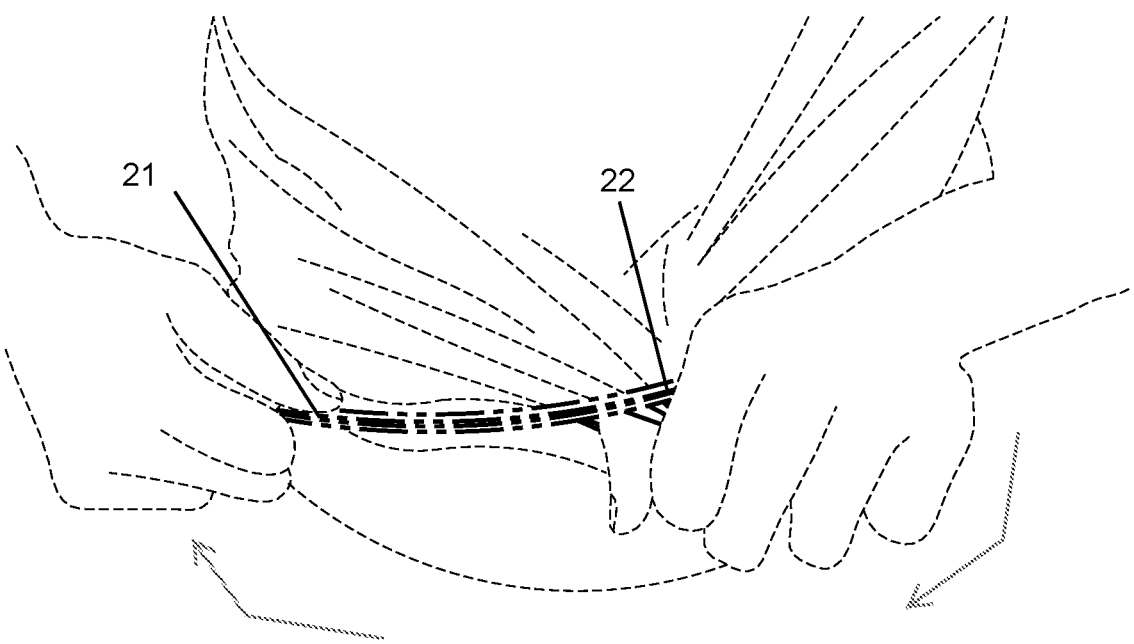
FIG. 8 is a front elevational view showing another exemplary step for using the metal strip with a clothing garment to create a knot-like appearance in the garment fabric.
Figure 9:
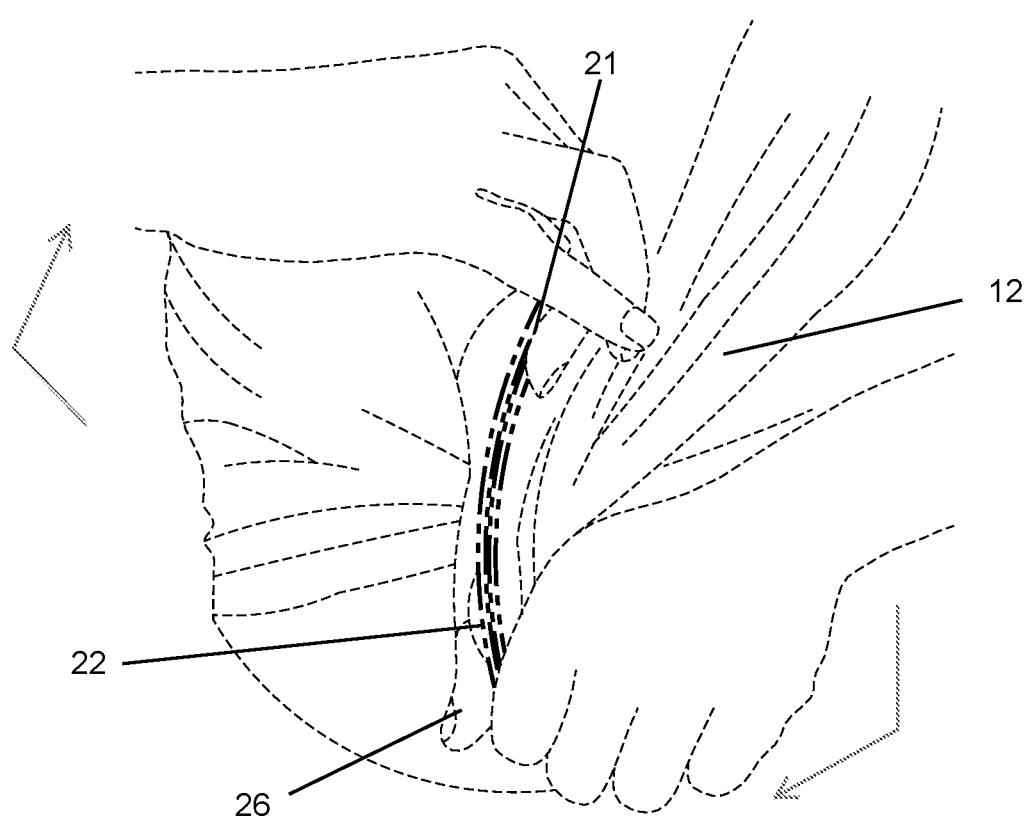
FIG. 9 is a front elevational view showing another exemplary step for using the metal strip with a clothing garment to create a knot-like appearance in the garment fabric.
Figure 10:
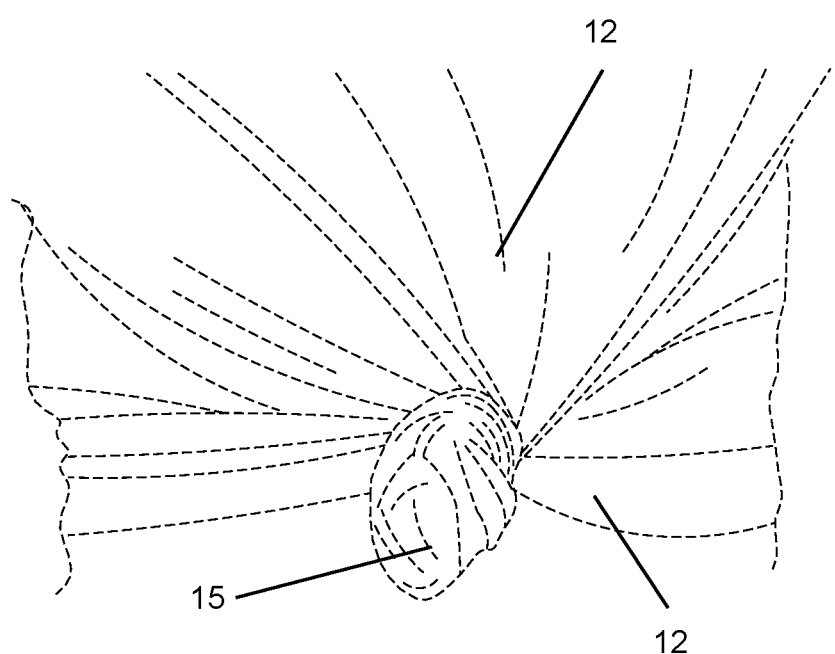
FIG. 10 is a front elevational view of a structure of the knot-like appearance formed at a bottom hem of the clothing garment.
Figure 11:
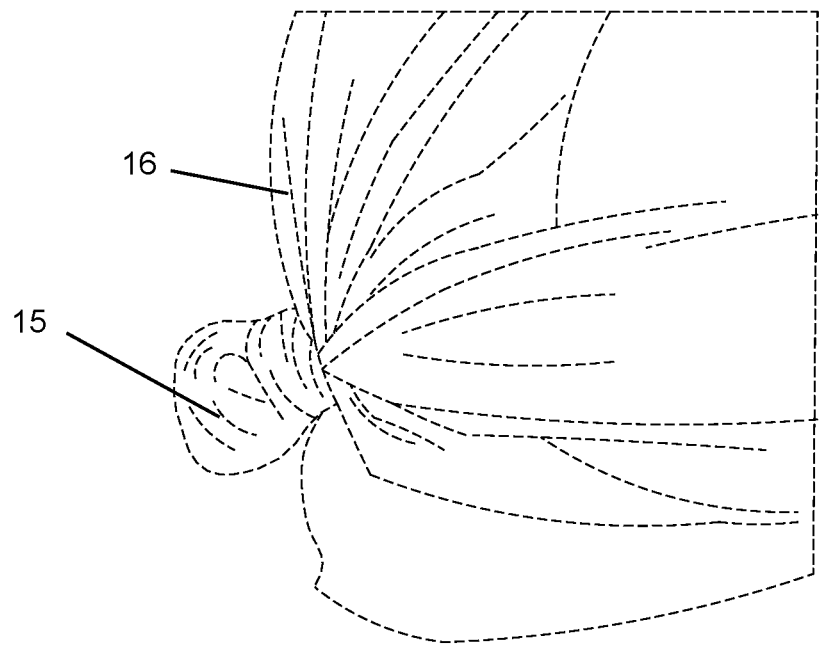
FIG. 11 is a side elevational view of the structure of the knot-like appearance formed at a bottom hem of the clothing garment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

Referring generally to FIGS. 1-16, a clothing garment 12 accessory 10 includes a metal strip 11 configured to be positioned inside an existing garment fabric 12 while being worn by a user. Advantageously, the metal strip 11 is flexible and configured to be morphed into a coiled helical shape 13 at a bottom hem 16 of the existing garment fabric 12. Advantageously, the metal strip 11 is further configured to create a knot-like appearance 15 at the bottom hem 16 of the existing garment fabric 12. Advantageously, the metal strip 11 is hidden from ambient lines of sight exterior of the existing garment fabric 12 when the knot-like appearance 15 exists at the bottom hem 16 of the existing garment fabric 12. Such method steps yield the new, useful, and unpredicted result of providing a knot-like configuration without stretching or damaging the clothing garment 12.

In a non-limiting exemplary embodiment, the metal strip 11 has an elongated rectangular shape provided with beveled corners 17. Such a structural configuration yields the new, useful, and unpredicted result of preventing damage to the clothing garment 12 during repeated use.

In a non-limiting exemplary embodiment, a textile fabric 18 is disposed about the metal strip 11. Such a textile fabric 18 includes a continuous peripheral edge having an uninterrupted and flexible seam 19. Such a structural configuration yields the new, useful, and unpredicted result of preventing damage to the clothing garment 12 during repeated use.

In a non-limiting exemplary embodiment, the metal strip 11 has a single, unitary, and solid body 20 configured to be deformably morphed between alternate shapes. Such a structural configuration yields the new, useful, and unpredicted result of preventing damage to the clothing garment 12 during repeated use.

In a non-limiting exemplary embodiment, the metal strip 11 is planar and provided with a proximal end 21 and a distal end 22 axially opposed therefrom when the metal strip 11 is at an initial shape 14. Such a structural configuration yields the new, useful, and unpredicted result of preventing damage to the clothing garment 12 during repeated use.

In a non-limiting exemplary embodiment, the metal strip 11 is configured to be repeatedly transformed between the initial shape 14 and the coiled helical shape 13. Notably, the proximal end 21 is axially offset from the distal end 22 when the metal strip 11 has the coiled helical shape 13. Such a structural configuration yields the new, useful, and unpredicted result of preventing damage to the clothing garment 12 during repeated use.

In a non-limiting exemplary embodiment, the coiled helical shape 13 is configured to twist the bottom hem 16 into the knot-like appearance 15. Such a structural configuration yields the new, useful, and unpredicted result of preventing damage to the clothing garment 12 during repeated use.

As perhaps best shown in FIGS. 3-12, the present disclosure also includes a method for creating a knot-like appearance 15 in a garment fabric 12 including the chronological steps of: providing a garment fabric 12; a user wearing the garment fabric 12 over an upper torso of the user; providing and positioning a flexible metal strip 11 inside the garment fabric 12 worn by the user; morphing the metal strip 11 into a coiled helical shape 13 at a bottom hem 16 of the garment fabric 12; and the metal strip 11 creating a knot-like appearance 15 at the bottom hem 16 of the garment fabric 12. Advantageously, the metal strip 11 is hidden from ambient lines of sight exterior of the garment fabric 12 when the knot-like appearance 15 exists at the bottom hem 16 of the garment fabric 12. Such method steps yield the new, useful, and unpredicted result of providing a knot-like configuration without stretching or damaging the clothing garment 12.

As perhaps best shown in FIGS. 3-12, the present disclosure further includes a method for creating a knot-like appearance 15 in a garment fabric 12, including the chronological steps of: providing and wearing a clothing garment 12 over an upper torso of a user body; providing a metal strip 11; pulling out a bottom hem 16 of the clothing garment 12 in front of the user; holding the clothing garment 12 at the bottom hem 16; positioning the metal strip 11 underneath the clothing garment 12 such that the metal strip 11 is intercalated between the user stomach and the clothing garment 12; positioning a bottom edge (distal end) 22 of the metal strip 11 above the bottom hem 16 of the clothing garment 12; and vertically orienting the metal strip 11 relative to a longitudinal length of the clothing garment 12. Such method steps yield the new, useful, and unpredicted result of providing a knot-like configuration without stretching or damaging the clothing garment 12.

Such chronological steps further include: gripping the bottom edge (distal end) 22 of the metal strip 11 and pushing it towards an anterior direction into the clothing garment 12 so that the metal strip 11 upwardly and frictionally engages the posterior side of the clothing garment 12; with one hand, gripping the bottom hem 16 of the clothing garment 12 together with the bottom edge (distal end) 22 of the metal strip 11 and, with the other hand, firmly gripping an upper portion 25 of the clothing garment 12 together with the top edge (proximal end) 21 of the metal strip 11; while firmly holding the top edge (proximal end) 21 of the metal strip 11 and upper portion 25 of the clothing garment 12 at a fixed and stationary position, contemporaneously rotating the bottom hem 16 of the clothing garment 12 and the bottom edge (distal end) 22 of metal strip 11 together about the top edge (proximal end) 21 of the metal strip 11 and upper portion 25 of the clothing garment 12 such that the metal strip 11 begins to form a coiled shape 13 and thereby creating a loop and a knot-like appearance 15 in the clothing garment 12; sliding a user metacarpal 26 (thumb) out from the loop at the top edge (proximal end) 21 of the metal strip 11 and upper portion 25 of the clothing garment 12; and continuing to rotate the metal strip 11 until a desired shape of the knot-like appearance 15 is achieved. Such method steps yield the new, useful, and unpredicted result of providing a knot-like configuration without stretching or damaging the clothing garment 12.

In a non-limiting exemplary embodiment, the method further includes the chronological steps of: undoing the knot-like appearance 15 by unwinding the coiled metal strip 11 in an opposite rotational direction; and releasing the bottom hem 16 of the clothing garment 12 from its knot-like appearance 15 and the metal strip 11. Such method steps yield the new, useful, and unpredicted result of providing a knot-like configuration without stretching or damaging the clothing garment 12.

Referring generally to FIGS. 1-16, the present disclosure includes a strip of metal 11 enclosed in a textile fabric 18 by way of stitching, adhesive, or hot press, for example. The strip of metal 11 can also be exposed, meaning not enclosed in textile. Advantageously, the present disclosure enables a user to coil (e.g., morph, deformably bend, twist, compress, etc.) the metal strip 11 and garment fabric 12 (e.g., t-shirt, shirt, blouse, sweater, dress, skirt, tunic, night-gown, scarf, etc.) into an appearance of knot without permanently stretching the garment fabric 12. Operation requires a person to (1) place the metal strip 11 underneath the garment fabric 12; (2) hold the metal strip 11 and garment fabric 12 tightly together; and then (3) while holding the metal strip 11 and garment fabric 12 tightly together, coil both the metal strip 11 and garment fabric 12 around the garment fabric 12 until the appearance of a knot 15 is formed.

Advantageously, the present disclosure provides an apparatus and associated method for creating a knot-like appearance 15 at a bottom hem 16 of a garment fabric 12 without permanently stretching the garment fabric 12. This overcomes the problem of a conventional knot necessarily stretching and damaging the garment fabric 12 because the garment fabric 12 is pulled through a loop and tightened, which causes extra stress on the fabric garment.

In a non-limiting exemplary embodiment, the metal strip 11 is morphed to a coiled (twisted, helical, bend, etc.) shape 13 thereby causing the garment fabric 12 to coil around itself and form the appearance of a knot 15. This provides an aesthetically appealing look for the fabric without permanently stretching the garment fabric 12 and ruining same. The flexibility of the metal strip 11 assists in both coiling the garment fabric 12 and securing the coiled garment fabric 12 in place so that it does not come undone.

In a non-limiting exemplary embodiment, the metal strip 11 may be enclosed in a textile 18 to prevent the edges of the metal strip 11 from cutting or piercing the garment fabric 12.

In a non-limiting exemplary embodiment, the metal strip 11 may be partially or fully exposed (without a textile sleeve 18 about the metal strip 11).

In a non-limiting exemplary embodiment, the metal strip 11 may include aluminum or another metal that is deformable, malleable, or flexible by simply twisting the metal strip 11 with a user's hands.

In a non-limiting exemplary embodiment, during operation, a user positions the metal strip 11 against an edge of the garment fabric 12 (e.g., bottom edge (distal end) 22 of t-shirt) and coils garment fabric 12 of the t-shirt into the appearance of a knot 15 by coiling the metal strip 11 together with the garment fabric 12. The metal strip 11 is used to cinch (tighten, bind, twist, etc.) the t-shirt at the user's waist to give the user a different option than tucking in the t-shirt into the pants.

In a non-limiting exemplary embodiment, the metal strip 11 may be wrapped with a separate piece of fabric 18 so that it does not tear the fabric 12 of the t-shirt.

In a non-limiting exemplary embodiment, the metal strip 11 is preferably between approximately seven to nine inches long and about one-half of an inch wide. Such a range is optimal. If the length of the metal strip 11 is outside this range, it may be too long or too short for a conventional garment worn by a user.

As perhaps best shown in FIGS. 3-12, in a non-limiting exemplary embodiment, first wear the t-shirt 12, then pull out the bottom hem 16 in front of you. Hold the t-shirt 12 at its bottom hem 16. Next, position the metal strip 11 underneath the t-shirt 12 (metal strip 11 is intercalated between the user stomach and inside the t-shirt 12) such that a bottom edge (distal end) 22 of the metal strip 11 is located about one inch above the bottom hem 16 of the t-shirt 12. Make sure the metal strip 11 is vertically oriented relative to the longitudinal length of the t-shirt 12 so that the bottom edge (distal end) 22 of the metal strip 11 is generally parallel to the bottom hem 16 of the t-shirt 12.

In a non-limiting exemplary embodiment, grip the bottom edge (distal end) 22 of the metal strip 11 and push it in an anterior direction into the t-shirt 12 so that so that the metal strip 11 upwardly and frictionally engages the posterior side of the t-shirt 12. With your left hand, grab the t-shirt 12 at the bottom hem 16 (around the user's stomach) while gripping and maintaining the bottom edge (distal end) 22 of the metal strip 11 together with the bottom hem 16 of the t-shirt 12. Upwardly pull the bottom hem 16 and bottom edge (distal end) 22 of the metal strip 11 and hold same together so that you can access the top edge (proximal end) 21 of the metal strip 11. With your right hand, use your thumb to hold the top edge (proximal end) 21 of the metal strip 11 so the top edge (proximal end) 21 protrudes about one-half inch out of your right hand. Lower the bottom hem 16 and bottom edge (distal end) 22 of the metal strip 11 downwardly so the t-shirt 12 lay generally flat on a user stomach area. The metal strip 11 is inside the t-shirt 12 at this point and is hidden to an ambient line of sight.

Figure 12:
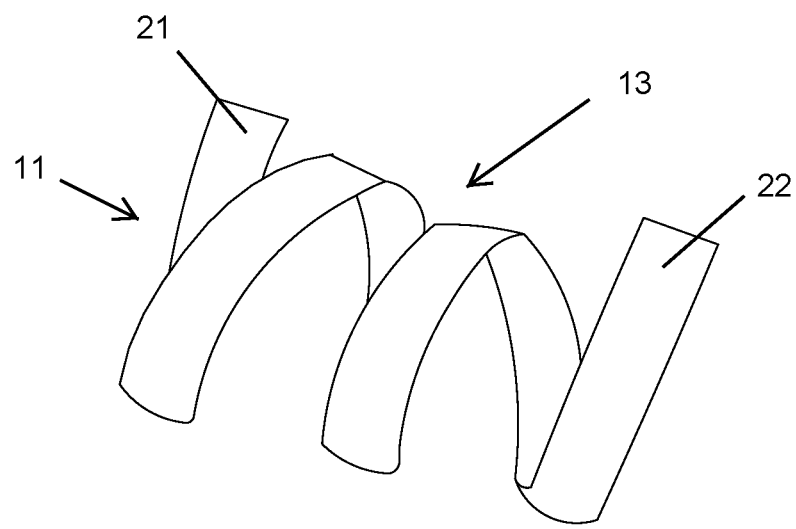
FIG. 12 is a side elevational view of the coiled (helical, twisted) metal strip at its final morphed shape for creating the structure of the knot-like appearance formed at a bottom hem of the clothing garment.

In a non-limiting exemplary embodiment, with one hand, firmly grip the bottom hem 16 of the t-shirt 12 together with the bottom edge (distal end) 22 of the metal strip 11 and, with the other hand, firmly grip an upper portion 25 of the t-shirt 12 together with the top edge (proximal end) 21 of the metal strip 11. While firmly holding the top edge (proximal end) 21 of the metal strip 11 and upper portion 25 of the t-shirt 12 at a fixed and stationary position, contemporaneously rotate (e.g., clockwise or counter clockwise) the bottom hem 16 of the t-shirt 12 and the bottom edge (distal end) 22 of the metal strip 11 together about the top edge (proximal end) 21 of the metal strip 11 and upper portion 25 of the t-shirt 12 such that the metal strip 11 begins to form a coiled shape 13 (FIG. 12 shows the final coiled shape 13). Morphing (twisting) the metal strip 11 into a coiled shape 13 causes the bottom hem 16 of the t-shirt 12 to create a loop and provide an appearance of a knot 15.

In a non-limiting exemplary embodiment, slide your thumb out from the loop at the top edge (proximal end) 21 of the metal strip 11 and upper portion 25 of the t-shirt 12. Continue rotating the metal strip 11 until a desired knot-like appearance 15 is achieved. For example, if a small, tight know requires more rotation of the metal strip 11. A larger, loose know requires less rotation of the metal strip 11. At this point, the metal strip 11 is morphed into a coiled (helical) and twisted shape and the t-shirt 12 loop is tightly held in place because it is frictionally entangled with the morphed metal strip 11. The morphed metal strip 11 creates a knot-like appearance 15 at the bottom hem 16 of the t-shirt 12. To undue the knot-like appearance 15, unwind the coiled metal strip 11 by rotating it in an opposite rotational direction. This will release the bottom hem 16 of the t-shirt 12 from its knot-like configuration.

In a non-limiting exemplary embodiment, the size and thickness of the garment fabric 12 (t-shirt 12) will determine the optimum length of the metal strip 11.

In a non-limiting exemplary embodiment, the total width with the metal strip 11 and textile wrapped thereabout is about one-half inch. Thus, the metal strip 11 is about one-quarter inch wide.

In a non-limiting exemplary embodiment, for a sweater the width of the metal strip 11 can be approximately one-half inch and together with its associated textile may be about three-quarters inch wide.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A method for creating a knot-like appearance in a garment fabric, said method comprising the chronological steps of:
   providing and wearing a clothing garment over an upper torso of a user;
   providing a metal strip;
   pulling out a bottom hem of the clothing garment in front of the user;
   holding the clothing garment at the bottom hem;
   positioning the metal strip underneath the clothing garment such that the metal strip is intercalated between a stomach of the user and the clothing garment;
   positioning a bottom edge of the metal strip above the bottom hem of the clothing garment;
   vertically orienting the metal strip relative to a longitudinal length of the clothing garment;
   gripping the bottom edge of the metal strip and pushing it towards an anterior direction into the clothing garment so that the metal strip upwardly and frictionally engages a posterior side of the clothing garment;
   with one hand, gripping the bottom hem of the clothing garment together with the bottom edge of the metal strip and, with the other hand, firmly gripping an upper portion of the clothing garment together with a top edge of the metal strip;

while firmly holding the top edge of the metal strip and upper portion of the clothing garment at a fixed and stationary position, contemporaneously rotating the bottom hem of the clothing garment and the bottom edge of the metal strip together about the top edge of the metal strip and upper portion of the clothing garment such that the metal strip begins to form a coiled shape and thereby creating a loop and a knot-like appearance in the clothing garment;

sliding a metacarpal of the user out from the loop at the top edge of the metal strip and upper portion of the clothing garment; and continuing to rotate the metal strip until a desired shape of the knot-like appearance is achieved.

2. The method of claim 1, further comprising the chronological steps of:

undoing the knot-like appearance by unwinding the coiled metal strip in an opposite rotational direction; and releasing the bottom hem of the clothing garment from the knot-like appearance and the metal strip.

3. The method of claim 1, wherein the metal strip has an elongated rectangular shape provided with beveled corners.

4. The method of claim 1, wherein the metal strip includes a textile fabric disposed about the metal strip, the textile fabric including a continuous peripheral edge having an uninterrupted and flexible seam.

5. The method of claim 1, wherein the metal strip has a single, unitary, and solid body configured to be deformably morphed between alternate shapes.

6. The method of claim 1, wherein the metal strip is planar at an initial shape.

\* \* \* \* \*